May 17, 1960 — R. L. BROWNLEE — 2,936,613
ENGINE TESTING MACHINES
Filed May 20, 1958 — 2 Sheets-Sheet 1

INVENTOR:
ROBERT L. BROWNLEE
BY
Stewart Batcheler
ATTORNEYS.

May 17, 1960
R. L. BROWNLEE
2,936,613
ENGINE TESTING MACHINES
Filed May 20, 1958
2 Sheets-Sheet 2
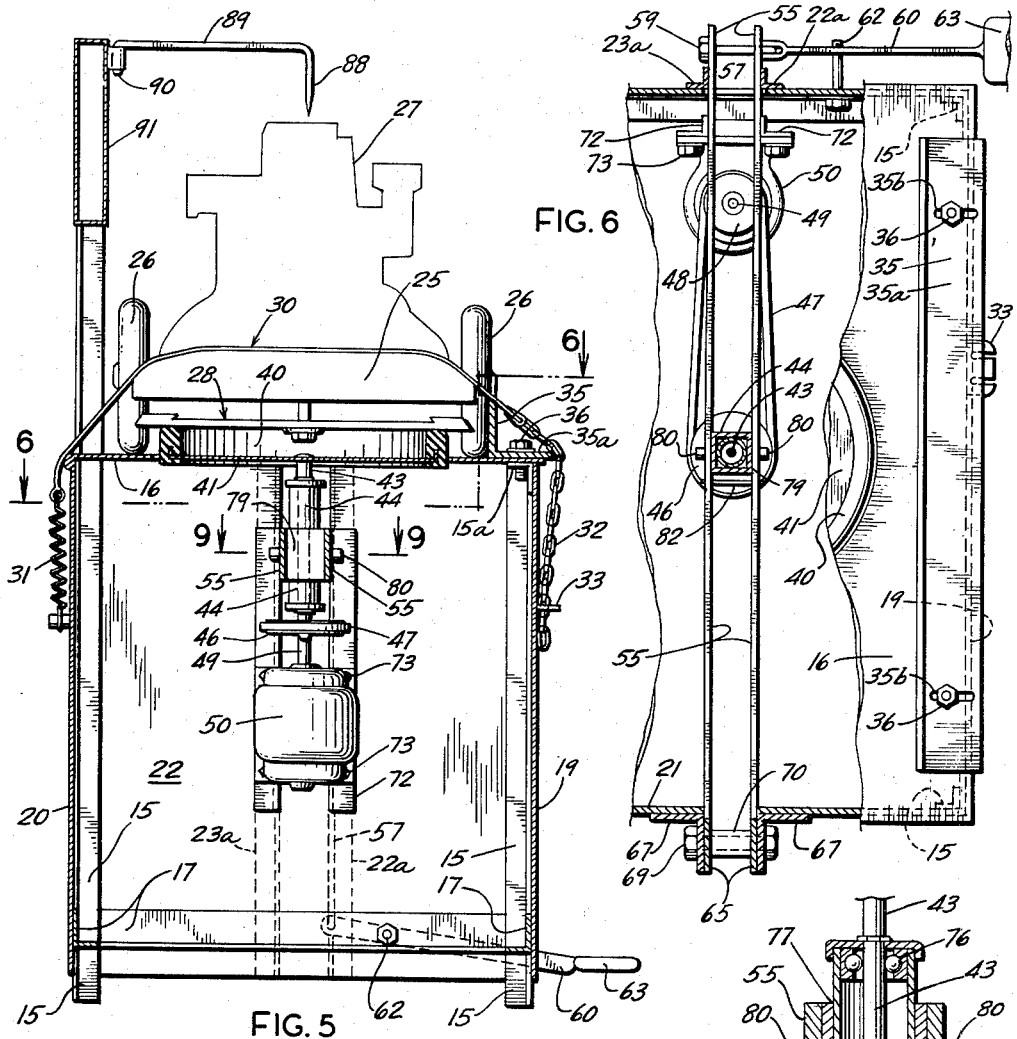
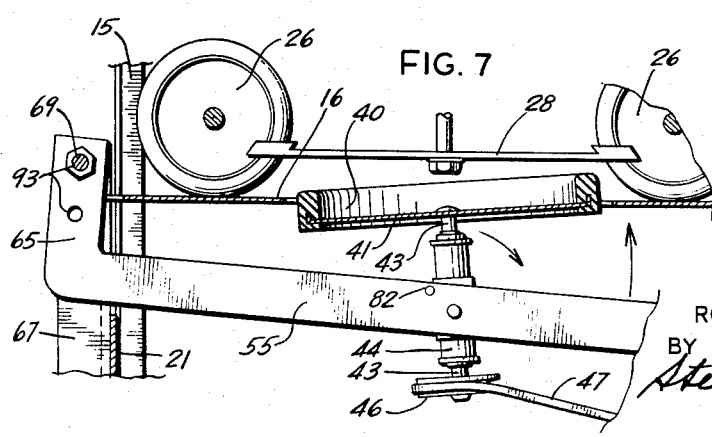
INVENTOR:
ROBERT L. BROWNLEE
BY
Stevens & Batcheler
ATTORNEYS.

United States Patent Office 2,936,613
Patented May 17, 1960

2,936,613

ENGINE TESTING MACHINES

Robert L. Brownlee, Mokena, Ill.

Application May 20, 1958, Serial No. 736,592

10 Claims. (Cl. 73—116)

My invention relates to grass mowers of the type employing a whirling horizontal blade. This type of mower has a frame which carries the blade on the under side, while an engine unit is mounted on the upper side. When an engine is out of order, the two most frequent causes are lack of compression and ignition trouble. When the engine is taken to the repair station, it is usually left until the repairman has an opportunity to make various tests in order to locate the fault. One reason for this is the difficulty of making the proper tests. Thus, a compression test is made when the engine is cranked while cold, a meter being attached to the engine to indicate the compression. The engine has no crank or other handy means for turning its shaft whenever desired, so that time must be taken and a special facility or action employed to crank the engine. Likewise, in order to test the ignition, it is also advisable to crank the engine and watch the action of the commutator and the points contained therein. Owing to the difficulty of applying the proper tests to grass mower engines, the service charges for repairs are necessarily high; and such difficulty often causes speculation as to the nature of the service or the extent of the charge.

Owing to the above conditions, it is one object of the present invention to provide a testing machine which renders it possible to apply the necessary tests with dispatch and while the customer is present, so that the nature of the trouble may be ascertained promptly and an estimate of repair charges made at the same time.

A further object is to provide a machine which may be actuated to crank the engine while it is cold, so that the necessary tests may be made while the running parts of the engine are in motion.

A still further object is to provide a testing machine on which the engine is adapted to be mounted, a mechanism being applicable to the mowing blade from below to operate the same.

An additional object is to design a mechanism in the testing machine which is actuated by simple pressure on a foot pedal, so that the hands of the operator may be free to apply testing devices to the engine.

Another object is to construct the blade turning mechanism in the form of a motor-operated unit which is movable to engage the mower blade for rotation on the actuation of the foot pedal.

A further object is to design the blade turning mechanism in a manner to procure a uniform degree of engagement with the mower blade, and to be adaptable to blades of different heights.

An important object is to design the testing machine in the form of a cabinet with most of the working parts concealed, and with means to hold the engine firm on the cabinet and to shield the attendant from the path of the rotating blade.

And yet another object of the invention is to provide novel orienting means permitting the drive shaft of a lawn mower being tested to be properly oriented in its test position relative to the underlying operating structure of the testing machine without reference to such operating structure.

A better understanding of the invention may be had by reference to the accompanying drawings which—

Fig. 5 is a section on the line 5—5 of Fig. 4;

Fig. 6 is a section on the line 6—6 of Fig. 5;

Fig. 7 is an interior view of the showing in the center portion of Fig. 1 on an enlarged scale;

Fig. 8 is an enlarged section on the line 8—8 of Fig. 4; and

Figure 1:
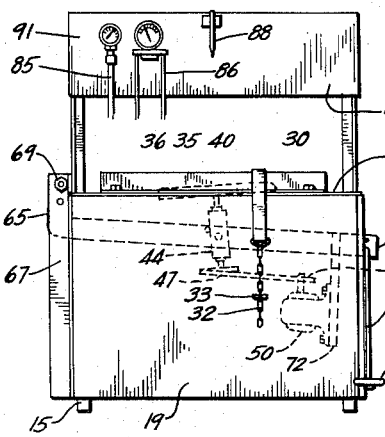
Fig. 1 is a front elevation of the testing machine, indicating the normal position of its working parts.

Referring specifically to the drawings, the machine is built with a frame composed of corner angle posts 15 formed with a top flange 15a to receive a top plate 16, this plate being welded or otherwise secured to the corner posts; and the latter receive spacers 17 all around near the bottom in order to make the frame rigid. The frame is enclosed in front by a panel 19, at the rear by a panel 20, on the left hand side by a panel 21 and on the right hand side by twin panels 22 and 23.

Figure 4:
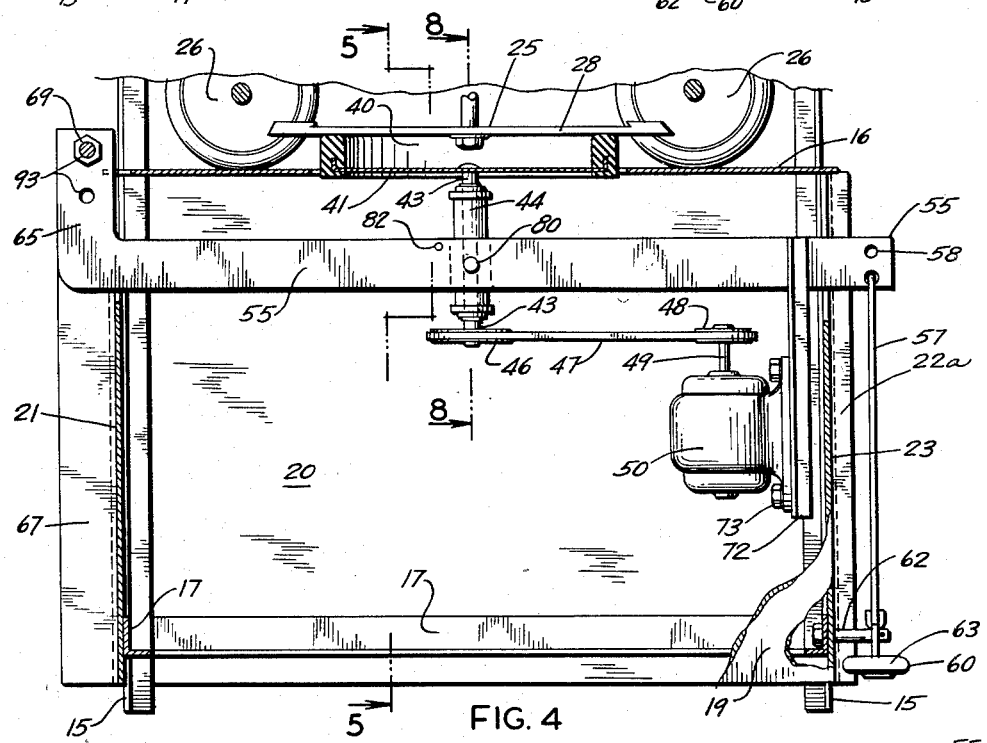
Fig. 4 is an internal view on a larger scale, taken from the front and showing the positions of the working parts when the blade engaging mechanism is applied.
Figure 3:
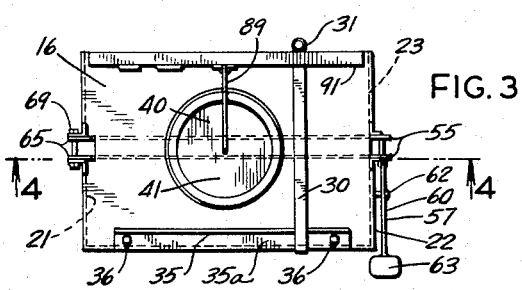
Fig. 3 is a top plan view.

Figs. 4 and 5 show that the mower 25 is mounted with its wheels 26 on the top plate 16, the engine unit being indicated at 27 and the rotatable blade at 28.

For the purpose of the invention, it is necessary that the mower be held firmly in place, and a binding strap 30 is therefore applied over the mower as shown in Fig. 5, one end of the strap drawing on a spring 31 attached in back of the panel 20, and the other end being formed with a chain 32 applicable to a keeper 33 carried by the panel 19 at a point consistent with a firm hold of the strap on the mower. In this connection, a shield 35 located in front over the top plate 16 is set against the nearer wheels 26 as shown in Fig. 5, the length of the shield being indicated in Fig. 6, so that the shield guards the attendant from injury by the blade 28. The shield is an angle-bar having a base 35a formed with cross-slots 35b, bolts 36 being applied by way of these slots through the flange 35a to adjust the shield according to the transverse spacing of the mower wheels.

The blade engaging mechanism primarily features a rubber ring 40 which occupies a deflected position below the blade and is carried by a disc 41. This disc is mounted on the upper end of a shaft 43 which passes through a housing 44. The lower end portion of the shaft 43 emerges from the housing to receive a pulley 46; and a belt 47 extends laterally from this pulley to a second pulley 48 carried by a shaft 49 of a vertical motor 50. The engaging ring 40 is normally positioned as shown in Figs. 1 and 7; and the mechanism is operable in a manner to level the ring when it is raised for the blade engaging action, so that the ring will assume the horizontally position indicated in Figs. 4 and 5 for uniform engagement with the blade.

The main factor which is instrumental to apply the ring 40 as stated consists of a twin-bar unit 55 located in the upper part of the frame as seen in Fig. 4. The right-hand end portion of the unit 55 extends out of the space between the panels 22 and 23 to terminate alongside a pull-rod 57, whose upper end passes through openings 58 in the unit sections to terminate with a head 59. The bottom of the pull-rod 57 is linked to one end of a treadle 60 which is pivoted at an intermediate point to the panel 22, as shown at 62. The treadle terminates in front with a foot pedal 63. Thus, pressure on the latter serves to raise the right-hand end of the twin-bar unit 55.

The other end of the twin-bar unit 55 is made with upward bends 65, the upper ends of the latter occurring between angle plates 67 which are welded to the left-hand side panel 21, as shown in Fig. 6. The angle plates 67 serve for the application of a pivoting bolt 69 and a spacer 70 for the bends 65, so that the twin-bar unit 55 swings on the pivot 69 when its right-hand end portion is raised as previously stated.

Figure 2:
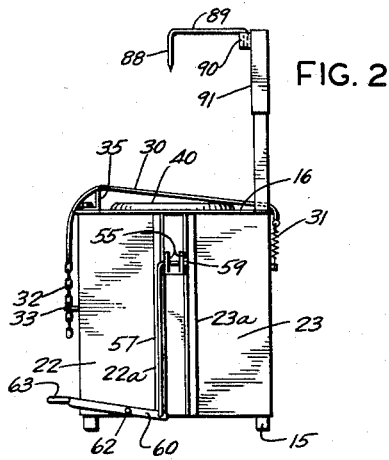
Fig. 2 is a side view.

Figs. 4 and 6 show that a pair of vertical angle bars 72 depend from the right-hand portion of the unit 55 on the inner side of the panels 22 and 23; and the electric motor 50 is bolted to these angle bars as indicated at 73. Figs. 2, 4 and 6 also show that the panels 22 and 23 receive angle bars 22a and 23a whose inner flanges occur alongside the swinging course of the twin-bar unit 55 in order to guide the latter in a vertical path.

Figure 9:
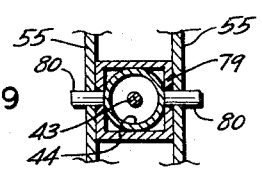
Fig. 9 is a section taken substantially on the line 9—9 of Fig. 5.

Figs. 8 and 9 show that the shaft 43 of the rubber ring 40 is journaled in the housing 44 equipped with terminal thrust bearings 76. The housing is welded at 77 in a block 79 whose external form is square, as shown in Fig. 9. The block 79 carries trunnions 80 extended through the sections of the twin-bar unit 55—as also shown in Fig. 4—so that the shaft 43 becomes pivoted for swinging motion between the said sections. A stop is provided against the excessive counterclockwise swing of the shaft 43, such stop being in the form of a crosspin 82 carried by the bars as shown in Fig. 4; and Figs. 1 and 7 show the assembly of the shaft 43 tilted against the stop 82.

When the mechanism is in the position just stated, it may be assumed that the belt 47 is slack, as indicated in Fig. 7, whereby not to transmit any motion from the motor 50 to the rubber ring 40. The same figure shows clearly that this ring is tilted away from the zone of the mower blade 28, so that the ring is out of the way of the blade. When a mower is secured on the testing machine as shown and is to be tested, the purpose is to put the blade 28 in motion by the application of the rotating ring 40, so that the mower engine 27 is given continuous cranking motion. This is done by depressing the pedal 63. In such event, the treadle 60 rocks to the position shown in Fig. 5, lifting the twin-bar unit 55 from the low position of Fig. 7 to the high position of Fig. 4. With the rubber ring 40 self-adjusting by means of the pivots 80, it follows that the ring will bear uniformly on the mower blade 28, as indicated in Fig. 4. In addition, the backswing of the ring from the tilted position of Fig. 1 to the horizontal position of Fig. 4 will carry the pulley 46 of the ring toward the left—as seen in Fig. 4—with effect of tightening the belt 47 into engaging relation with the motor pulley 48, so that a continuous drive is transmitted to the ring 40 when the motor is put into operation.

With the engine cranked continuously it is possible to apply a compression testing accessory 85 shown in Fig. 1, and also an ignition testing accessory 86 shown in the same figure, without delay and while the customer is being waited on. In consequence, it may be determined readily whether the engine needs minor or extensive repairs, and the cost thereof quoted to the customer.

In the application of the rubber ring 40 to the mower blade 28, it is of course important that the ring shaft and blade shaft be in alinement, in order that a lateral vibration may not be set up in the transmission of the drive from the ring to the blade. While the mower shaft is hard to see or reach from underneath, it usually has an upper end or a central element which is visible on top of the mower. In order to aline this element with the drive shaft 43, an overhead pointer 88 is employed which is in alinement with the ring shaft, the engine then being adjusted to have its top indicating element positioned directly under the pointer 88. The latter is part of a horizontal bracket 89 which is pivoted as shown at 90 to a top panel 91 of the machine, so that the pointer may be swung aside when the mower is to be removed or replaced by another mower.

In some mowers the blade 28 is set low while in others it is set high. In order to adapt the present mechanism to this variation, the bend 65 of the twin-bar unit 55 is made with upper and lower holes 93 for setting the unit to the corresponding height; and upper and lower openings 58 are made in the opposite end of the unit for attaching the pull-rod 57 accordingly.

It will now be apparent that the novel testing machine is a facility which procures the cranking of the mower engine at a moment's notice, and does not require any manual assistance for this purpose. Thus, the hands of the attendant are free to apply the customary tests in order to determine the condition of the engine and the amount of repairs that may be required. Further, the mechanism of the machine is almost entirely enclosed, keeping the attendant or others in the premises safe against power-operated parts in the machine. Further, the mounting of the mower on the top of the machine is firmly accomplished and has a safety factor shielding the attendant from the mower blade at all times. Further, the internal mechanism is constituted to apply the cranking element squarely and uniformly against the mower blade, whereby to procure even cranking rotation. Further, the application of the cranking element in a proper relation to the blade automatically engages the motor drive to the same, so that such drive is only made possible when pedal 63 has been pressed to apply the cranking element. Finally, the parts entering into the mechanism are simple and few in number, so that the machine can be produced at relatively low cost.

While I have described the invention along specific lines, various minor changes or refinements may be made therein without departing from its principle, and I reserve the right to employ all such changes and refinements as may come within the scope and spirit of the appended claims.

I claim:

1. A cranking mechanism for a power mower having a rotary horizontal blade at the bottom, comprising a support, a motor carried by the same, a rotary member adapted to engage the blade from the underneath, drive means from the motor to the rotary member, and applying means to apply the rotary member to the blade and put said drive means in operation, the rotary member being a ring with a yieldable engaging surface, means for normally supporting the ring in a position spaced from the rotating path of the blade, and said applying means is effective to raise the ring into uniform application to the blade as said drive means is put into operation.

2. A cranking mechanism for a power mower having a rotary horizontal blade at the bottom, comprising a support, a motor carried by the same, a rotary member adapted to engage the blade from the underneath, drive means from the motor to the rotary member, and applying means to apply the rotary member to the blade and put said drive means in operation, the rotary member being a ring with a yieldable engaging surface, means for normally supporting the ring in a position deflected from the rotating path of the blade, said applying means is effective to raise the ring, and the resistance of the blade to the engaging pressure of the ring leveling the latter into uniform engagement with the blade.

3. A cranking mechanism for a power mower having a rotary horizontal blade at the bottom, comprising a support, means pivoted with one end at one side of the support and extending crosswise thereof, a control connected at the other side of the support to swing said means in upward direction, and a rotary unit carried by said means and engageable with said blade from underneath when said means are swung as stated, the rotary unit being pivoted horizontally in said means, and having a top ring as the element engageable with the blade, a stop affording the rotary unit a rest in an inclined position, and the engagement of the ring with the blade on the rising of said means causing the rotary unit to swing away from said stop and level the ring into uniform engagement with the blade.

4. A cranking mechanism for a power mower having a rotary horizontal blade at the bottom, comprising a support, means pivoted with one end at one side of the support and extending crosswise thereof, a control connected at the other side of the support to swing said means in upward direction, and a rotary unit carried by said means engageable with said blade from underneath when said means are swung as stated, the rotary unit being pivoted horizontally in said means and having a top ring as the element engageable with the blade, a stop affording the rotary unit a rest in an inclined position, a bottom pulley carried by the rotary unit, and a belt drive for the pulley and slack when the rotary unit is at rest, the engagement of the ring with the blade on the rising of said means causing the rotary unit to swing away from said stop, and carry the pulley in a direction to tighten said belt drive, whereby to level the ring into uniform engagement with the blade and cause the belt drive to operate the rotary unit.

5. A cranking mechanism for a power mower having a rotary horizontal blade at the bottom, comprising a support, means pivoted with one end at one side of the support and extending crosswise thereof, a control connected at the other side of the support to swing said means in upward direction, and a rotary unit carried by said means and engageable with said blade from underneath when said means are swung as stated, said means being twin bars receiving the rotary unit between them, and the bars having upbends to the point where they are pivoted to render the bars underslung from such point.

6. A cranking mechanism for a power mower having a rotary horizontal blade at the bottom, comprising a support, means pivoted with one end at one side of the support and extending crosswise thereof, a control connected at the other side of the support to swing said means in upward direction, and a rotary unit carried by said means and engageable with said blade from underneath when said means are swung as stated, said control comprising a treadle pivoted at a point intermediate its ends to the lower portion of the support, a foot pedal carried by one end of the treadle, and a rod rising from the other end of the treadle to that of said means.

7. A cranking mechanism for a power mower having a rotary horizontal blade at the bottom, comprising a support, a motor carried by the same, a rotary member adapted to engage the blade from underneath, drive means from the motor to the rotary member, and applying means to vertically adjust and apply the rotary member to the blade and put said drive means in operation, the rotary member including a vertical axis of rotation and including at least a pair of spaced friction-portions on opposite sides of said vertical axis of rotation for engagement with spaced portions beneath said mower blade, guard means at one side of and extending vertically from said support, and means normally supporting said rotary member in a position spaced beneath the path of rotation of said mower blade, said means to apply said rotary member being effective to raise said rotary member with the spaced friction portions into uniform application on the mower blade to rotate the same about a horizontal axis.

8. The structure of claim 7 including manually engageable strap means on said support extending from one side thereof and over said guard means for retaining the mower in a relatively fixed position in relation to said guard means.

9. In a mower testing apparatus for use with a power mower having a vertical engine shaft, a horizontal blade mounted on said shaft, and an indicia portion on an upper portion locating the axis of rotation of said shaft; a horizontal support for supporting a mower in a normal operating position, a rotary drive member on said support for rotating the mower blade and having a vertical axis of rotation, and a guide aligned with the vertical axis of rotation of said rotary drive member and positionable above the indicia means of said mower to align the engine shaft with the axis of rotation of said drive member.

10. The structure of claim 9 in which said guide comprises a pointer pivotally mounted on said support for movement in elevated horizontal plane into and out of alignment with said vertical axis of rotation.

References Cited in the file of this patent

UNITED STATES PATENTS

| | | |
|---|---|---|
| 1,397,296 | Schaf et al. | Nov. 15, 1921 |
| 1,587,894 | Bronk et al. | June 8, 1926 |
| 1,805,896 | Weinland | May 19, 1931 |
| 2,074,840 | Greentree | Mar. 23, 1937 |
| 2,174,061 | Pereny | Sept. 26, 1939 |
| 2,298,656 | Smith | Oct. 13, 1942 |
| 2,565,473 | Cline | Aug. 28, 1951 |